2 Sheets—Sheet 1.

C. BERRYMAN.
Corn Planter.

No. 201,489. Patented March 19, 1878.

Witnesses:
Donn I. Twitchell
Will N. Dodge

Inventor:
Craton Berryman
By his attys.
Dodge & Son

N. PETERS, PHOTO-LITHOGRAPHER, WASHINGTON, D. C.

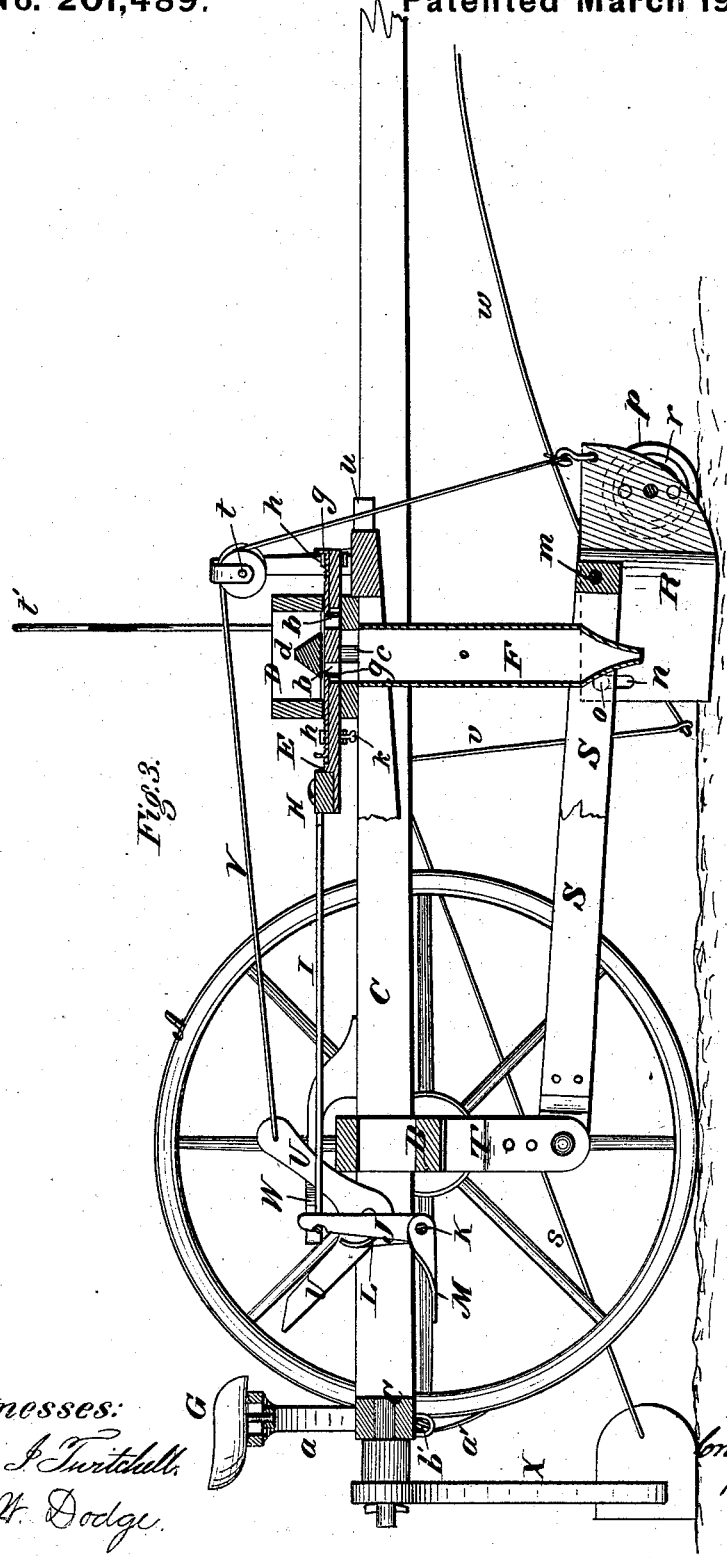

UNITED STATES PATENT OFFICE.

CRATON BERRYMAN, OF MONROE, WISCONSIN.

IMPROVEMENT IN CORN-PLANTERS.

Specification forming part of Letters Patent No. 201,489, dated March 19, 1878; application filed February 26, 1877.

*To all whom it may concern:*

Be it known that I, CRATON BERRYMAN, of Monroe, in the county of Green and State of Wisconsin, have invented certain Improvements in Corn-Planting Machines, of which the following is a specification:

My invention relates to that class of wheeled two-row planters in which the furrows are opened by and the corn dropped by slides through the heels of two runners, but more especially to improvements on the machine for which Letters Patent were granted to me bearing date March 2, 1875, No. 160,382; and the invention consists in various details, hereinafter described, whereby the action of the machine is improved, and the operator enabled to control the same almost entirely by his feet.

Figure 1:
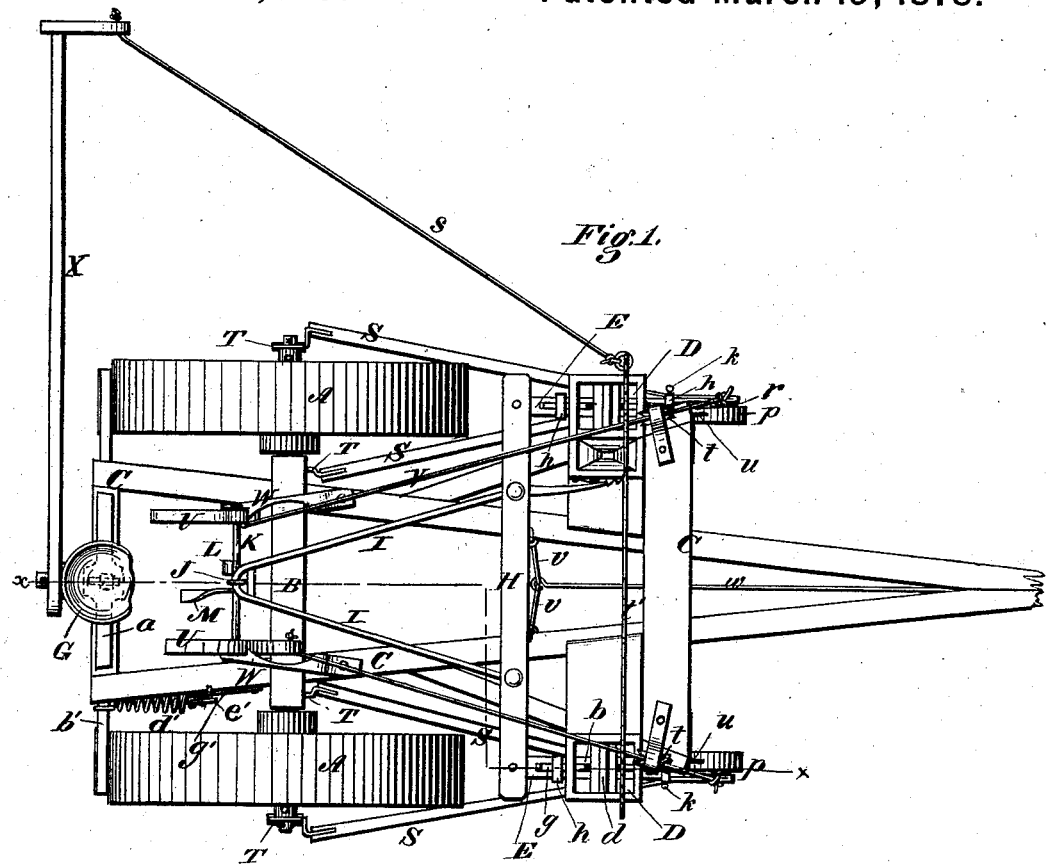
Figure 2:
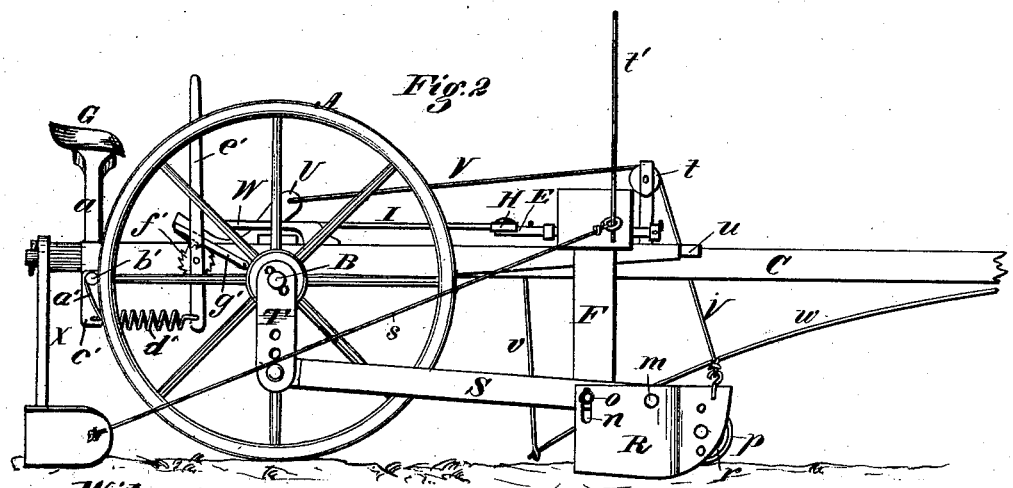

Figure 1 represents a top plan-view of my machine; Fig. 2, a side elevation of the same; Fig. 3, a view illustrating the construction of the feed-slides, &c., on the line $x\ x$ of Fig. 1.

A A represent two large wheels, mounted loosely on the ends of an axle, B, upon which there is firmly secured a rigid main frame, C, of the form and construction shown.

On the outer front corners of the frame there are mounted, in front of the main wheels, two corn-hoppers, D, provided with horizontal reciprocating slides E, to feed the corn, and with depending spouts or conductors F, to guide the corn into the furrows. On the rear end of the main frame there is mounted a seat, G, for the operator, as shown in Figs. 1 and 2, the seat being secured by a bolt to a standard, $a$, which has its top slotted, to admit of the bolt and seat being adjusted forward and backward.

For the purpose of operating the feed-slides E, I connect their rear ends by a cross-bar, H, and connect the latter by rods I to an arm, J, mounted on a rock-shaft, K, which latter is mounted transversely in the rear end of the frame, and provided with two foot-levers, L and M, the former standing upright and the latter horizontally, as shown in Figs. 1 and 3.

The operator, occupying the seat G, rests his left foot on the lever L and his right foot on the lever M, and by operating the two alternately imparts a rocking motion to the shaft K, which, in turn, through the arm J and rods I, causes the feed-slides to move back and forth.

As shown in Fig. 3, the feed-slides are each provided, as usual, with two seed-cells, $b$, and arranged to slide over a discharge-opening, $c$, in the hopper-bottom, and under a cut-off plate, $d$, arranged directly above the discharge-opening, so that, as the slides move back and forth, the cells fill with corn and pass under the cut-off plates to discharge alternately.

In order that the size of the cells $b$ may be varied to increase or diminish the amount of corn planted in each hill, each seed-cell has its outer side formed by the end of a small adjustable slide, $g$, mounted in the feed-slide E, as shown in Figs. 1 and 3. The regulating-slides $g$ are each provided in the outer end with teeth or serrations on top, and held from moving in the main slide by means of metallic bands $h$, which are clasped around the outer ends of the main slide over the small slides $g$, and provided with ribs or teeth to enter the teeth in the small slides, and with thumb-screws $k$, by which to fasten them in place. When the screws $k$ are loosened, the bands $h$ and slides $g$ may be readily adjusted to give the seed-cells any size required.

I am aware that the cells of a feed-slide have been varied by means of the small slide heretofore; but I am not aware that the parts have ever been arranged and secured as in my machine.

For the purpose of opening the furrows in the ground to receive the corn, I employ two runners, R, attached to the forward ends of arms or bars S, which latter are pivoted at their rear ends to depending arms T, secured rigidly to the main axle of the machine, as shown in Figs. 1 and 2, each runner being arranged directly in advance of one of the main wheels, and provided with two of the arms S, passing on opposite sides of the wheel, as shown. The runners thus arranged and pushed from behind have a motion independent of each other and of the main frame, and, owing to the fact that the arms S are elevated somewhat at the rear end, they force the runners into the ground in such manner as to insure the formation of the furrows thereby.

In order that the downward thrust of the arms upon the runners may be increased or diminished, as the character and condition of the ground may require, the arms T of the axle are provided with a series of holes to receive the pivots of the arms S, which may have their rear ends elevated to any required height.

In order that the runners R may be retained in their horizontal position, notwithstanding the adjustment of the arms T, they are pivoted to the arms at $m$, and provided in their rear ends with slots $n$, through which clamping-bolts $o$ are inserted into the arms, as shown, the slots permitting the runners to be adjusted on the pivots, as required.

The depth to which the runners enter the ground is controlled or limited by small wheels $p$, mounted on the inner sides of the runners at their forwards ends, and arranged to run upon the surface of the ground, as shown.

In order to prevent sticks, stones, or other obstructions from wedging between the runners and the inner-side faces of the wheels $p$, the latter are provided with annular flanges or ribs $r$ on the inside, near the periphery, as shown.

For the purpose of raising the runners from the ground, I mount in the rear end of the main frame, on opposite sides, two elbow foot-levers, U, and connect thereto two cords or chains, V, passing forward and downward over guide-pulleys $t$ on the front of the frame to the points of the runners, as shown, so that the operator, while in his seat, can, by pressing with his feet on the levers, raise either or both runners.

In order to uphold the runners when the machine is moving to or from the field, and when turning, two spring-catches, W, are mounted in the rear end of the frame to engage with the foot-levers U, and hold them back.

In order to prevent the lifting-chains V, when slackened, from catching between the runners and the gage-wheels $p$, small arms $u$ are secured to the front of the main frame, as shown.

For the purpose of marking the ground at each transit of the machine across the field for the next row, the machine has pivoted to the rear end of the main frame, below and in rear of the operator's seat, a long reversible arm, X, the outer end of which is provided with a head or runner to travel on the ground. The outer end of the arm is drawn forward by means of a cord, $s$, the forward end of which is provided with a ring or eye, mounted loosely on a rod, $t'$, which latter is arched over the front of the machine from side to side, as shown, the arrangement permitting the operator to readily turn the marking-arm over from one side of the machine to the other without dismounting from his seat, the arm swinging behind the seat, and the cord being carried over the operator's head by the arm and the elevated rod.

In order to aid the operator in dropping the corn at the precise points desired, where the lines on the ground intersect, the frame is provided with an indicator, consisting of a rod, $w$, extending downward from the front of the frame to a point in rear of the line of the runner-heels, and of two rods, $v$, extending upward from the rear end of the rod $w$ through eyes on the inner sides of the frame, as shown.

As the machine advances, the point formed by the junction of the three rods rides upon the ground, in full view of the operator, who has only to guide his team in such manner that the point will follow one of the usual lines on the ground, and then to operate the planting levers or treadles whenever the point reaches an intersecting line.

By constructing the guide as shown, it is permitted to follow the inequalities in the surface of the ground, and the operator enabled by its assistance to drop the corn with great accuracy.

For the purpose of keeping the tread of the main wheels clean I employ scrapers $a'$, mounted on the ends of a transverse rock-shaft, $b'$, which is provided with an arm, $c'$, connected by a spiral spring, $d'$, to a hand-lever, $e'$, which latter is provided with a ratchet-plate, $f'$, to receive the end of a locking dog or pawl, $g'$, as shown in Figs. 1 and 2.

By means of the lever and dog the spring may be given any required degree of tension, and caused to draw and hold the scrapers against the wheels with any required pressure.

By hanging the arms S on the depending arms T, I am enabled to sustain the former in a nearly-horizontal position, and to overcome the excessive downward pressure which they would exert upon the runners were their ends elevated to and hung upon the axle or the frame.

This feature is of special importance, in view of the peculiar form and action of the runners R, which serve to open the furrows to receive the corn. It should be distinctly noticed and borne in mind that the runners R are not equivalents of the clearing devices employed in my original machine to remove stones and rubbish from the path of a furrow-opening shovel, but that they are themselves furrow-openers, and that they possess all the distinguishing characteristics of the other runners employed in various well-known machines in common use.

I am aware that it is not new to actuate the feed-slides of planting-machines by means of foot-levers; and I am also aware that a rock-shaft provided with pedals is not alone new, and it is not to said features separately, but to the special arrangement in connection with the slides, that I make claim.

Having thus described my invention, what I claim is—

1. In a corn-planting machine, the combination of an axle, B, provided with rigid depending arms T, and inclined arms or bars S, pivoted at their rear ends to the arms T, and provided at their forward ends with runners R, adapted to open the furrows, as shown and described.

2. In a corn-planting machine, the longitudinal inclined arms S, having their forward ends provided with the furrow-opening runners R, and their rear ends mounted on vertically-adjustable pivots, substantially as shown, whereby they may be caused to produce more or less downward pressure on the runners, as the nature and condition of the soil may require.

3. The combination of the arms or bars S, having their ends pivoted and made vertically-adjustable, with the runners R, attached to and made adjustable on said bars, substantially as shown.

4. In combination with the pivoted adjustable bars or arms S, the runners R, provided with the slots $n$, the pivots $m$, and the fastening-bolt $o$.

5. In a corn-planter having the driver's seat G on the rear end, the combination of the feed-slides connected by the bar H, having the arm I, with the rock-shaft K, provided with the arm J, and the two pedals L M, the latter arranged in position to be actuated directly by the feet of the driver, as shown and described.

6. In combination with the reversible marker X, the cord $s$ and the arched rod $t'$, mounted on the front of the machine, as shown.

7. The indicator, consisting of the rods $v$ $v$ $w$, mounted in the middle of the machine, as shown.

8. In combination with the feed-slides E, the gage-slides $g$, bands or clamps $h$, and screws $k$, as shown.

9. In combination with the rock-shaft $b'$, provided with the scrapers $a'$, and arm $c'$, the spring $d'$ and the hand-lever $e'$, with its locking devices, as shown.

10. In combination with the runners R, the wheels $p$, provided with the annular flanges $r$, as and for the purpose shown and described.

CRATON BERRYMAN.

Witnesses:
W. DINWIDDIE,
F. DINWIDDIE.